June 2, 1964  M. SIEBENBERG  3,135,184
PHOTOGRAPHIC ACCESSORY

Filed Jan. 13, 1961 2 Sheets-Sheet 1

INVENTOR.
MAX SIEBENBERG
BY Blum, Moscovitz,
Friedman & Blum
ATTORNEYS

June 2, 1964 M. SIEBENBERG 3,135,184
PHOTOGRAPHIC ACCESSORY
Filed Jan. 13, 1961 2 Sheets-Sheet 2

INVENTOR.
MAX SIEBENBERG
BY Blum, Moscovitz,
Friedman & Blum
ATTORNEYS

United States Patent Office 3,135,184
Patented June 2, 1964

3,135,184
PHOTOGRAPHIC ACCESSORY
Max Siebenberg, 625 Caton Ave., Brooklyn 18, N.Y.
Filed Jan. 13, 1961, Ser. No. 82,561
5 Claims. (Cl. 95—36)

This invention relates generally to photographic accessories, and is especially concerned with an accessory for attachment to a camera.

While the device of the present invention has been primarily developed and employed as an attachment for the objective of a camera, and will be illustrated and described hereinafter with particular reference thereto, it is appreciated that the invention may be incorporated as original equipment in a camera, if desired, and is capable of many varied applications, all of which are intended to be comprehended herein.

It is one object of the present invention to provide a photographic accessory for use in conjunction with a camera wherein a single frame of film may be employed to record a plurality of separate and distinct pictures.

It is another object of the present invention to provide a photographic accessory which enables different shutter openings or exposures to be recorded on a single frame of a film, such that the exposures may overlap and present the appearance of a single picture. This feature permits of many startling results, such as a single photograph showing an individual in two different poses, and many others.

It is a further object of the present invention to provide a device of the type described which is extremely easy to use, requiring no special skill or training, and which is compact and light in weight for convenient portabiilty both together with and apart from a camera.

It is still a further object of the present invention to provide a photographic accessory having the advantageous characteristics mentioned in the preceding paragraphs which is simple in construction, requiring a minimum of parts, durable and reliable in use, and which can be economically manufactured for sale at a reasonable price.

Other objects of the present invention will become apparent upon reading the following specification and referring to the accompanying drawings, which form a material part of this disclosure.

The invention accordingly consists in the features of construction, combinations of elements, and arrangement of parts, which will be exemplified in the construction hereinafter described, and of which the scope will be indicated by the appended claims.

Figure 1:
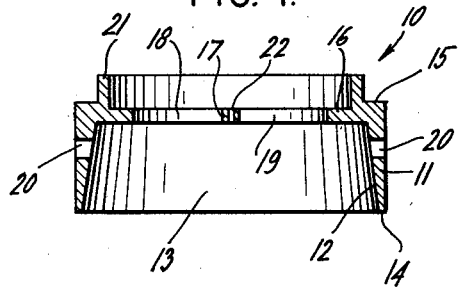
FIGURE 1 is a sectional view taken through one part of the device of the present invention, as along the line 1—1 of FIGURE 2.
Figure 2:
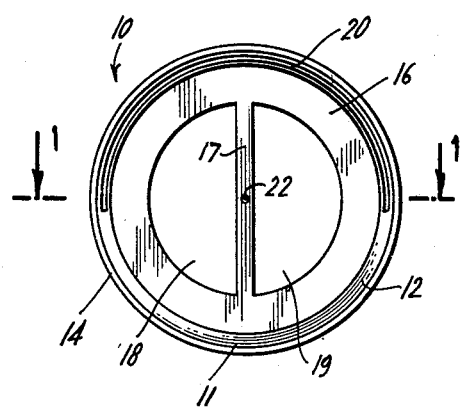
FIGURE 2 is a bottom view of the part of FIGURE 1.

Referring now more particularly to the drawings, and specifically to FIGURES 1 and 2 thereof, there is shown therein a generally cylindrical open-ended part or body, generally designated 10, having a cylindrical or annular side wall 11 provided interiorly with a rearwardly flaring, generally conical surface 12. That is, the internal conical surface 12 defines a through opening 13 tapering forwardly from the rear end 14 of the cylindrical body 11 toward the forward body end 15. Just inward or rearward of the forward body end 15, there is provided interiorly of the body an annular, internal shoulder or flange 16 extending circumferentially about and constricting the through opening 13. The annular flange 16 is of generally circular configuration; and, a diametral mounting member or bridge 17 extends across and coplanar with the shoulder 16, subdividing the opening bounded within the shoulder into a pair of substantially identical approximately semicircular openings 18 and 19.

The cylindrical wall 11 of body 10 may be formed with a through slot 20 extending approximately 180 degrees about the circumference of the cylindrical wall and located in spaced relation between the rear end 14 and forward shoulder 16. Also, an annular forwardly projecting wall or flange 21 circumscribes the forward end of through opening 13, forward of the annular shoulder 16. That is, the annular, generally circular flange 21 projects forward from the front end 15 of the cylindrical wall 11 and extends circumferentially about the annular flange 16, being of an internal diameter larger than that of the flange 16 and of an external diameter less than that of the wall 11. A through bore 22 may be formed in the mounting bridge 17 at the midpoint thereof, extending generally axially of the wall 11 and its central through opening 13, for purposes appearing presently.

Figure 3:
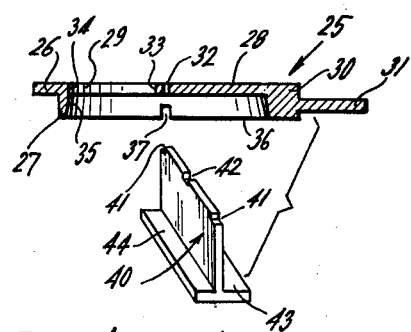
FIGURE 3 is a sectional view taken through another part of the device of the instant invention, as along line 3—3 of FIGURE 4, and showing in perspective an additional part adapted for optional connection to the instant device.
Figure 4:
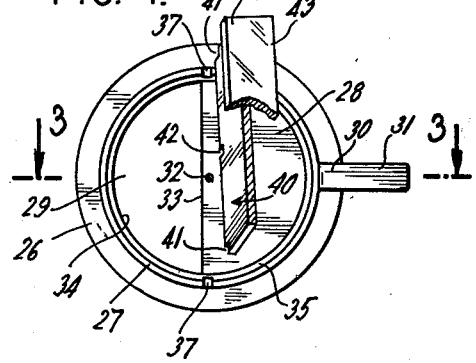
FIGURE 4 is a bottom view of the parts as shown in FIGURE 3.

A mask part is shown in FIGURES 3 and 4, these being generally designated 25. The mask part includes an annular, generally planar rim or margin 26 provided with an annular flange 27 concentric with and extending about the rim, spaced radially inward from the outer bounding edge of the rim.

Generally coplanar with the annular rim 26, and covering substantially one-half of the interior thereof is a generally semicircular plate portion or mask proper 28. Specifically, the generally semicircular mask proper 28 extends across and closes slightly more than half of the interior of rim 26, leaving a generally semicircular opening 29, which is actually slightly less than semicircular, and defined within the rim 26 and the mask proper 28.

The mask part 25 has its rim and flange 27 thickened at one portion 30 and there formed with a radially outstanding actuating member or arm 31.

As the mask proper 28 is slightly greater than semicircular, it extends slightly beyond the center of annular rim 26, and is there formed with a through bore or opening 32 substantially concentric with the rim. The bounding edge 33 of the mask proper 28, located slightly over or beyond the center hole 32, is substantially straight and combines with the internal edge 34 of the rim 26 to bound the slightly less than semicircular opening 29. Further, the annular flange 27 has its internal surface 35 of conical configuration flaring rearwardly from the opening 29 to the rear flange edge 36.

The rearwardly projecting annular flange 27 is formed with a pair of diametrically opposed cutouts or notches 37 each extending forward or inward through the rear flange edge 36 and terminating short of the rim 26. Further, the cutouts or notches 37 are located on a diameter extending generally along the edge 33 of mask proper 28.

A mask extension member or plate, generally designated 40, may be of approximately rectangular configuration having one pair of corners notched, as at 41 for interfitting engagement in the notches 37 to extend diametrically across the rim 26 and its flange 27, and project rearward therebeyond. Spaced medially between the corner notches 41, the mask extension or plate 40 may be formed with an edge notch 42 adapted to register with the central bore 32, for a purpose appearing presently. The mask extension or plate 40 is frictionally engageable in and removable from the mask part 25.

Further, the mask extension or plate 40 is provided along its longitudinal edge opposite to the notches 41 with a pair of longitudinally extending, laterally oppositely outstanding flanges 43 and 44. The flanges 43 and 44 are in alignment or coplanar with each other, so that the mask extension 40 is generally T-shaped in cross section. However, the flange 43 on one side extends laterally outward further than the flange 44 on the other side. That is, the flange 43 is appreciably wider than the flange 44, for a purpose appearing presently.

Figure 5:
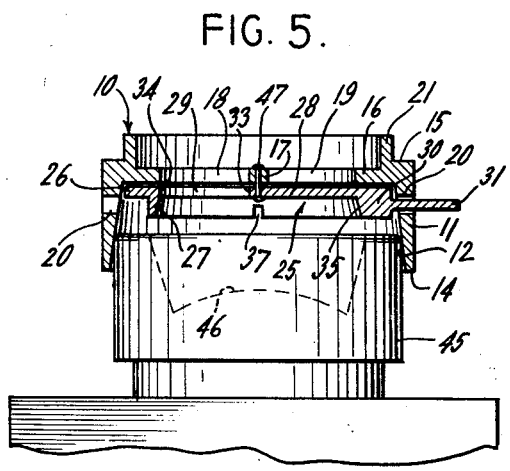
FIGURE 5 is a sectional view showing a completed device of the present invention in operative association with a camera.
Figure 6:
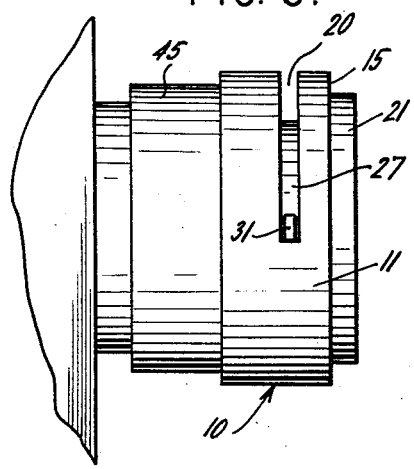
FIGURE 6 is an elevational view showing the assembly of FIGURE 5.

The body part 15 and the mask part 25 are shown in assembled condition in FIGURES 5 and 6, together with a camera objective. The camera objective may be conventional, including a generally cylindrical lens mount 45 housing the objective lens 46.

The mask part 25 is located coaxially within the opening 13 of the cylindrical or tubular wall 11 adjacent to and rearward of the annular shoulder 16. The arm 31 projects radially outward freely through and beyond the slot 20. In this condition, the bore 22 of mounting bridge 17 is in alignment with the bore 32 of the mask proper 28; and, a pivot or rivet 42 is engaged through the aligned bores to mount the mask part 25 for rotation axially of and within the body 10.

Figure 7:
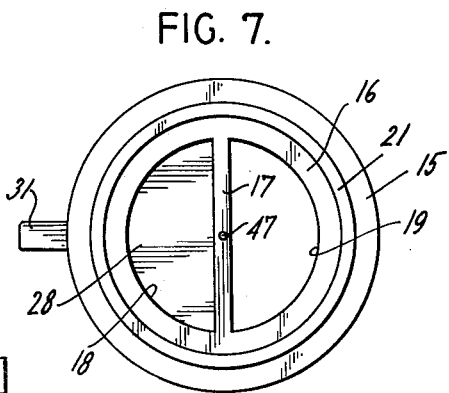
FIGURE 7 is a front view showing the entire device of the instant invention in one operative condition of use.
Figure 8:
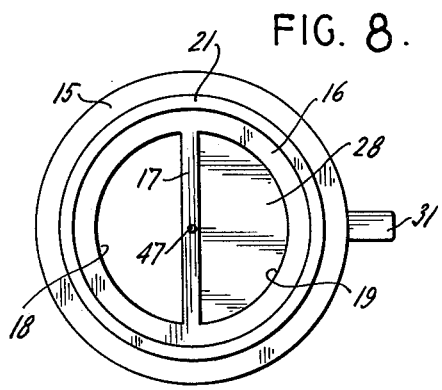
FIGURE 8 is a front view similar to FIGURE 7 but in another operative condition of use.

In the operative condition of FIGURES 5 and 6, the cylindrical body 10 has its rear end engaged over the front end of the lens mount 45, and may be frictionally or otherwise removably retained thereon. Thus, the body opening 13 and its subdivisions 18 and 19 are in registry with the objective lens 46 to pass light thereto. The mask part 25 is interposed between the subdivisions or openings 18 and 19, and the objective lens 46; and further, the mask proper 28 is of a size to completely occlude a single one of the openings 18 or 19, according to the angular position of the mask part 25. As illustrated in FIGURE 5, the mask proper 28 occludes the opening 19 and leaves unobstructed the opening 18. However, the mask part 25 is rotatable approximately 180 degrees so that the mask proper may occlude the opening 18 and leave unobstructed the opening 19. This latter condition is shown in FIGURE 7, while the former condition is shown in FIGURE 8.

Figure 9:
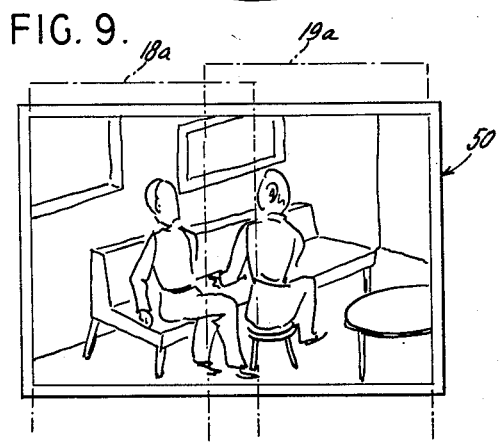
FIGURE 9 illustrates a photograph produced by the operative conditions of FIGURES 7 and 8.

The size of each opening 18 and 19, and its arrangement relative to the objective lens 46, is such that each of the openings will transmit light through the objective lens to expose a major portion, or more than half of a single film frame. For example, with the opening 19 unoccluded, as shown in FIGURE 7, and upon opening of the camera shutter, a portion of a film frame, as outlined at 19a will be exposed, while upon opening of the subdivision 18 and actuation of the shutter, a film portion 18a will be exposed. It is observed that the film portions 18a and 19a of the entire film frame 50 overlap in the medial region thereof. Thus, by fixedly positioning the camera, and without moving the film in the camera, successive shutter openings with the mask proper 28 in the respective conditions of FIGURES 7 and 8 will produce a photograph, as in FIGURE 9, which appears to be a complete single photograph. However, during the interval between successive shutter openings, the objects being photographed may be changed to create some startling effects, say by a person moving to a different location and thereby appearing twice in a single photograph.

Figure 10:
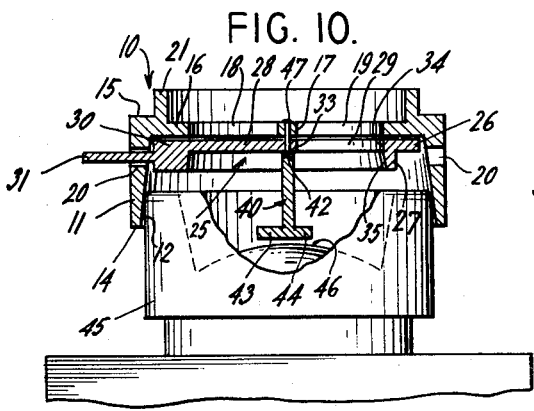
FIGURE 10 is a sectional view, partly broken away, showing the device of the instant invention, including an optional element, and in operative association with a camera objective, as taken along a line 10—10 of FIGURE 11.

While it may, under certain circumstances, be desirable that overlapping portions of a single film frame be exposed upon successive openings of the shutter, such as the portions 18a and 19a, it may also be desired to produce a plurality of separate and entirely distinct photographs on a single film frame. This may be accomplished by utilization of the mask extension or plate 40, see FIGURES 10–12. In FIGURE 10 it will be observed that the mask extension 40 is in position with its notches 41 in interfitting frictional engagement with the notches 37 of the mask part 25, and extends rearward therefrom, substantially bisecting the body opening 13 and terminating proximate to the objective lens 46. With the mask extension 40 in place, and the mask proper 28 occluding a single subdivided opening, say the opening 18 as seen in FIGURE 10, this leaves only the opening 19 unoccluded. Further, the location of the mask extension 40 restricts the entrance of light rays passing through the opening 19 to a more limited area on the film, in the illustrated embodiment the light rays occupying less than half of the film to produce a picture 51 on slightly less than one-half of the film frame 52. Upon reversal of the mask part 25 to occlude opening 19, and upon actuation of the shutter, light rays passing through opening 18 are limited or restricted to produce a picture 53 on the film frame 52 entirely separate from the picture 51. In this manner, the number of pictures obtainable from a quantity of film may be considerably increased, with the added versatility of obtaining smaller or larger pictures as conditions warrant.

Figure 11:
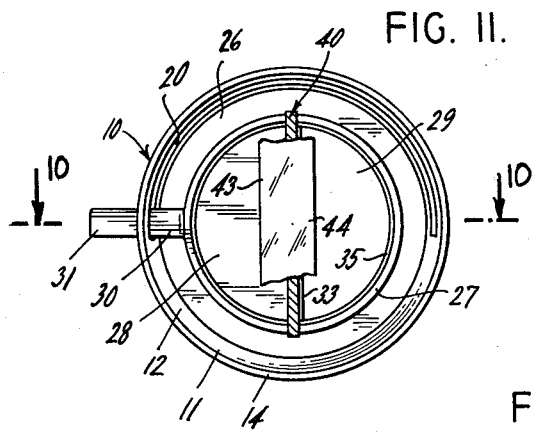
FIGURE 11 is a rear view of the device of the instant invention as shown in FIGURE 10.
Figure 12:
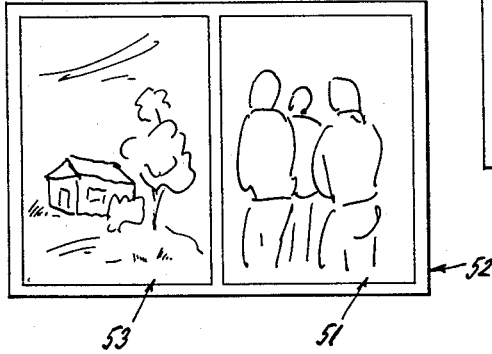
FIGURE 12 illustrates a photographic product resulting from use of the device of FIGURES 10 and 11 including the optional element shown therein.

Also, the extension or plate 40 is reversible from the condition of FIGURES 10 and 11 with the narrow flange 44 in the light opening to place the wider flange 43 in the light opening. That is, the extension or plate 40 is selectively arrangeable to locate either the wider flange 43 or the narrower flange 44 in the light opening, to pass less light or more light, as required. For example, if it is desired to use relatively fast film, say of the type designated "Polaroid 3,000," the extension 40 would be arranged with its wider flange 43 extending into the light-receiving path, while a film of less speed may require that the narrower flange 44 extend into the light-receiving path. Also, an extension 40 without flanges 43 and 44 may be employed for use with films of even less speed, if desired. It is understood, that for a film of a particular speed, it is not necessary to remove, reverse and replace the extension 40, as this is all automatically accomplished upon reversal of the mask part which carries the extension.

From the foregoing, it is seen that the present invention provides a photographic accessory which fully accomplishes its intended objects and is well-adapted to meet practical conditions of manufacture and use.

Although the present invention has been described in some detail by way of illustration and example for purposes of clarity of understanding, it is understood that certain changes and modifications may be made within the spirit of the invention and scope of the appended claims.

What is claimed is:

1. A photographic accessory comprising a generally cylindrical open-ended body having an axis, a front end, and a rear end portion adapted to be frictionally mounted over the outer periphery of the forward end of a camera objective, said body having a transverse partition intermediate its ends, said partition having circumferentially spaced openings, a mask, means mounting said mask in said body so that said mask is turnable about said axis and slidably frictionally abuts the rear face of said partition, said mask having a mask opening of the same size and shape as said partition openings and positioned to register therewith so as to expose selectively one of said partition openings and block the other, depending upon the turned position of said mask, said partition openings being each of sufficient size to pass light to a major portion of a single film frame, whereby successive shutter openings with said mask occluding respective partition openings expose overlapping portions of film, said mask having a longitudinal, generally cylindrical mask flange on its rear face, said body having a slot extending circumferentially and located rearwardly of said partition, said mask having a fingerpiece extending radially outwardly thereof and frictionally slidably through said slot and outwardly of said body, said mask flange extending rearwardly of said slot, whereby said mask is movable to expose selected regions of a single film frame upon successive shutter openings for photographing desired images on said selected regions, a plate, and means mounting said plate on the rear of said mask with said plate extending diametrically and longitudinally and extending to the rear face of said mask and also extending to said mask flange, said plate being located between said partition openings when said mask opening is in registration with either of said partition openings, said plate combining with said mask to exclude light from a major portion of a single film frame, whereby separate pictures may be photographed on a single film frame upon successive shutter openings, said plate having a transverse flange on its rear face, said plate flange also extending diametrically, said plate flange extending beyond the respective sides of said plate, the amount of extension being greater upon one side of said plate than on the other, said plate being reversible in its position on said mask.

2. A photographic accessory comprising a generally cylindrical open-ended body having an axis, a front end, and a rear end portion adapted to be frictionally mounted over the outer periphery of the forward end of a camera objective, said body having a transverse annular flange intermediate its ends, said body flange including a mounting bridge extending diametrically across its central opening, said bridge dividing the central opening of said body flange into a pair of generally semi-circular openings, a disc-shaped mask of greater diameter than the diameter of the central opening of said body flange and extending transversely and frictionally received within said body rearwardly of said body flange, means pivotally mounting said mask centrally on said bridge so that said mask is turnable about said axis and slidably abuts said body flange, said mask having a generally semi-circular mask opening of the same size as said semi-circular body flange openings and positioned to register therewith so as selectively to expose one of said semi-circular flange openings and block the other depending upon the turned position of said mask, said semi-circular flange openings being each of sufficient size to pass light to a major portion of a single film frame, whereby successive shutter openings with said mask occluding respective partition openings expose overlapping portions of said film, said mask having a longitudinal, generally cylindrical mask flange on its rear face whose bore is axially aligned with and of the same general diameter as the diameter of the central opening of said body flange, said body having a slot extending circumferentially and located rearwardly of said body flange, said body flange having a fingerpiece extending radially outwardly thereof and frictionally slidably through said slot and outwardly of said body, said mask flange extending rearwardly of said slot, whereby said mask is movable to expose selective regions of a single film frame upon successive shutter openings for photographing desired images on said selected regions, a plate, and means mounting said plate on the rear of said mask with said plate extending diametrically and longitudinally and extending to the rear face of said mask and also extending to said mask flange, said plate located between said partition openings when said mask opening is in registration with either of said partition openings, said plate combining with said mask to exclude light from a major portion of a single film frame, whereby separate pictures may be photographed on a single film frame upon successive shutter openings.

3. A photographic accessory according to claim 2, said plate having a transverse flange on its rear face, said plate flange also extending diametrically, said plate flange extending beyond the respective sides of said plate, the amount of extension being greater upon one side of said plate than on the other, said plate being reversible in its position on said mask.

4. A photographic accessory comprising a generally cylindrical open-ended body having an axis, a front end, and a rear end portion adapted to be frictionally mounted over the outer periphery of the forward end of a camera objective, said body having a transverse partition intermediate its ends, said partition having circumferentially spaced openings, a mask, means mounting said mask in said body so that said mask is turnable about said axis and slidably frictionally abuts the rear face of said partition, said mask having a mask opening of the same size and shape as said partition opening and positioned to register therewith so as to selectively expose one of said partition openings and block the other depending upon the turned position of said mask, said partition openings being each of sufficient size to pass light to a major portion of a single film frame, whereby successive shutter openings with said mask occluding respective partition openings expose overlapping portions of film, a plate, means mounting said plate on the rear of said mask with said plate extending diametrically and longitudinally and extending to the rear face of said mask and also extending across said mask, said plate being located between said partition openings when said mask opening is in registration with either of said partition openings, said plate combining with said mask to exclude light from a major portion of a single film frame, whereby separate pictures may be photographed on a single film frame upon successive shutter openings.

5. A photographic accessory according to claim 4, said plate having a transverse flange on its rear face, said plate flange also extending diametrically, said plate flange extending beyond the respective sides of said plate, the amount of extension being greater upon one side of said plate than on the other, said plate being reversible in its position on said mask.

References Cited in the file of this patent
UNITED STATES PATENTS

| | | |
|---|---|---|
| 1,056,588 | Rusk | Mar. 18, 1913 |
| 2,421,746 | Duffy | June 10, 1947 |